(12) United States Patent
Bai et al.

(10) Patent No.: US 7,235,037 B2
(45) Date of Patent: Jun. 26, 2007

(54) FRICTION LAUNCH CONTROL SYSTEM FOR A VEHICLE

(75) Inventors: Shushan Bai, Ann Arbor, MI (US); Donald L. Dusenberry, Farmington Hills, MI (US); Joel M. Maguire, Northville, MI (US); Andrew W. Phillips, Saline, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 232 days.

(21) Appl. No.: 11/076,724

(22) Filed: Mar. 10, 2005

(65) Prior Publication Data
US 2006/0205563 A1    Sep. 14, 2006

(51) Int. Cl.
*B60W 10/02* (2006.01)

(52) U.S. Cl. ..................................................... 477/180

(58) Field of Classification Search ................. 477/180
See application file for complete search history.

(56) References Cited

U.S. PATENT DOCUMENTS

| | | | |
|---|---|---|---|
| 5,378,211 A * | 1/1995 | Slicker et al. ............... | 477/180 |
| 5,766,110 A | 6/1998 | Kanno et al. | |
| 5,980,428 A * | 11/1999 | Liu ............................. | 477/180 |
| 6,364,813 B1 * | 4/2002 | Patel et al. .................. | 477/180 |

* cited by examiner

*Primary Examiner*—Ha Ho
(74) *Attorney, Agent, or Firm*—Dan L. Thompson

(57) ABSTRACT

A launch control system for a vehicle having an engine includes a clutch that selectively enables torque transfer from the engine. A control module determines a launch torque based on a throttle position and an engine speed to achieve a target engine stall speed. The control module determines a clutch torque based on the launch torque and that regulates engagement of the clutch based on the clutch torque.

17 Claims, 9 Drawing Sheets

FRICTION LAUNCH CONTROL SYSTEM FOR A VEHICLE

FIELD OF THE INVENTION

The present invention relates to a vehicle powertrain, and more particularly to a launch control system for a vehicle powertrain.

BACKGROUND OF THE INVENTION

A vehicle powertrain typically includes a transmission, an engine, and a powertrain controller. The transmission transfers engine output torque through a gear reduction to a driveshaft, which rotates the wheels of the vehicle. The powertrain controller controls the operation of the transmission and the engine. Powertrains traditionally include launch devices including, but not limited to, a torque converter or friction clutch. More specifically, automatic transmissions generally include a torque converter and manual or automated manual transmissions (AMTs) include a friction clutch. Friction launch devices gradually couple rotating members so that they become fixed for rotation together.

Traditional friction launch control strategies include closed loop slip speed control and fluid coupling emulation control. Closed loop slip speed control monitors the slip speed across the friction launch device and regulates the slip speed so that is follows a single, desired profile. Closed loop slip speed control is not sufficiently robust against system variations and can not maintain stable operation. Fluid coupling emulation control simulates fluid coupling characteristics and regulates the friction launch device to emulate a single torque absorption curve. Fluid coupling emulation control, however, does not provide sufficient degrees of freedom to achieve a desired engine stall speed for a variety of throttle openings.

SUMMARY OF THE INVENTION

Accordingly, the present invention provides a launch control system for a vehicle having an engine. The launch control system includes a clutch that selectively enables torque transfer from the engine and a control module that determines a launch torque based on a throttle position and an engine speed to achieve a target engine stall speed. The control module determines a clutch torque based on the launch torque and regulates engagement of the clutch based on the clutch torque.

In other features, the launch torque is determined based on an initial launch torque and a modifier. The initial launch torque is determined based on the throttle position and the engine speed. The modifier is determined based on a speed ratio between an input shaft and an output shaft of the transmission and the throttle position.

In other features, the clutch torque is further determined based on a lock torque. The lock torque is determined based on an engine torque.

In other features, the clutch torque is determined based on a lock-up variable. The lock-up variable is based on a lock-up state of the clutch and has a value that ranges from 0 to 1. The lock-up variable is determined based on a throttle position and a speed of the output shaft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
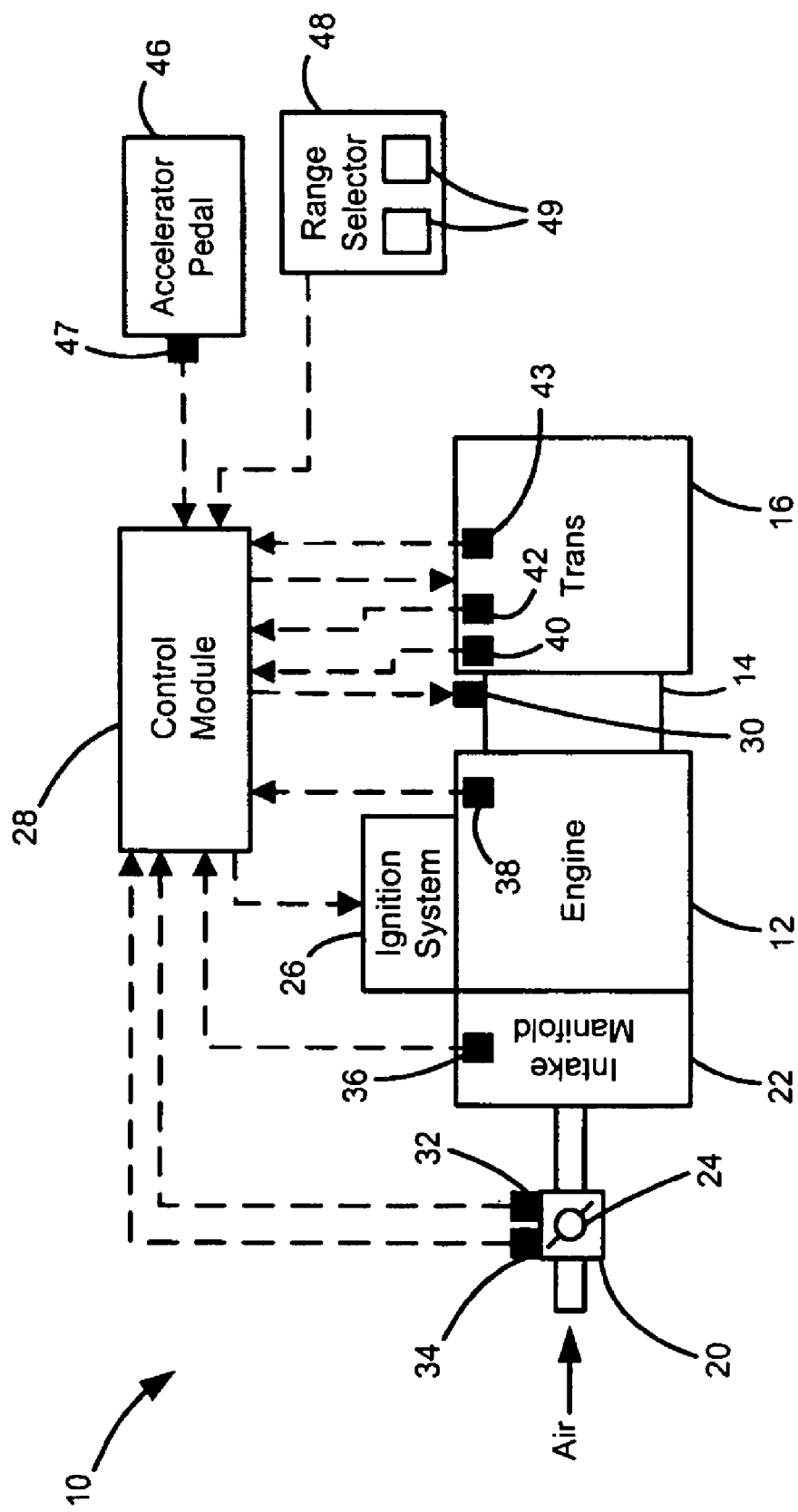
FIG. 1 is a schematic illustration of a vehicle incorporating the launch control system of the present invention.

The following description of the preferred embodiments is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

The present invention provides a friction launch control system that increases the efficiency of a transmission. The launch control system can be implemented to regulate power transmission through any system that uses a frictional clutch. Such systems include, but are not limited to, a step-ratio transmission, a continuous variable transmission (CVT), a freewheeler transmission, a clutch-to-clutch transmission, a multiple-clutch transmission (AT), an automated manual transmission (AMT), a dual clutch transmission (DCT) and a system having a separated starting clutch or other suitable clutches. The launch control system of the present invention regulates the torque transferred through a launch clutch during vehicle launch. For example, in the case of an automatic transmission, the launch clutch includes a clutch that is used to establish a gear ratio. It is also anticipated that the launch clutch can include a clutch that selectively couples the engine and the transmission, such as in the case of an AMT.

Referring now to FIG. 1, a vehicle 10 is schematically illustrated. The vehicle 10 includes an engine 12, a coupling mechanism 14 and a transmission 16. The coupling mechanism 14 selectively couples the engine 12 and transmission 16 to transfer drive torque from the engine 12 to the transmission 16 to drive the vehicle 10. The coupling mechanism 14 can include, but is not limited to, a friction clutch, such as in the case of an AMT. The transmission 16 includes an input shaft that is driven by the engine 12 through the clutch 14 and an output shaft that drives a driveline.

The engine 12 includes a throttle 20 and an intake manifold 22. Air is drawn into the intake manifold 22 through the throttle 20. The throttle 20 includes a throttle plate 24 that is adjustable to regulate the air flow into the intake manifold 22. Air drawn into the intake manifold 22 is mixed with fuel for combustion within cylinders (not shown) of the engine 12. Combustion of the air fuel mixture is initialized by spark plugs that are controlled by an ignition system 26. Spark plug timing can be adjusted by the ignition system 26 relative to the stroke position of pistons (not shown) slidably disposed within the cylinders. Spark advance or retard relative to piston stroke position can be used to adjust the torque output of the engine 12.

A control module 28 controls operation of the engine 12, the coupling mechanism 14 and the transmission 16. Although the control module 28 is shown as a single control module that controls and monitors the powertrain of the vehicle 10, it is anticipated that the control module 28 can include separate control modules such as an engine control module (ECM) and transmission control module (TCM) that communicate via a serial bus. The control module 28 communicates with the ignition system 26 to control spark timing and an actuator 30 to control the coupling mechanism 14. The actuator 30 can be a mechanical actuator or a hydraulic actuator that regulates the coupling mechanism 14 by varying hydraulic pressure.

The control module 28 also communicates with a throttle position sensor (TPS) 32 and a throttle actuator 34. The TPS 32 generates a throttle position signal (TP), which corresponds to a percent throttle opening. The throttle actuator 34 adjusts the position of the throttle plate 24 based on a control signal generated by the control module 28. The control module 28 also communicates with an intake manifold absolute pressure (MAP) sensor 36 and an engine speed sensor 38. The MAP sensor 36 generates a pressure signal and the engine speed sensor 38 generates a speed signal indicating the engine speed (RPM). A first speed sensor 40 generates a signal corresponding to a transmission input shaft speed (TISS). A gear sensor 42 generates a signal indicating the current gear the transmission is operating in. A second speed sensor 43 generates a signal corresponding to a transmission output shaft speed (TOSS).

The vehicle 10 further includes an accelerator pedal 46 (i.e., throttle input) and a range selector 48 (i.e., shift input). An accelerator pedal position (APP) sensor 47 generates an APP signal that is communicated to the control module 28. The control module 28 controls actuation of the throttle plate 24 based on the APP signal. The range selector 48 is a multi-state switch and includes tap-up/tap-down shift inputs 49. The range selector 48 electrically communicates with the transmission 16 to indicate an operating mode of the transmission 16. The operating modes can include, but are not limited to, park, reverse, neutral, drive and tap shift. In the drive mode, the control module 28 determines gear shifting based on a shift schedule. In the tap shift mode, a vehicle operator can command a gear shift (up or down). In either mode, a shift signal is generated indicating that a gear shift is desired.

Figure 2:
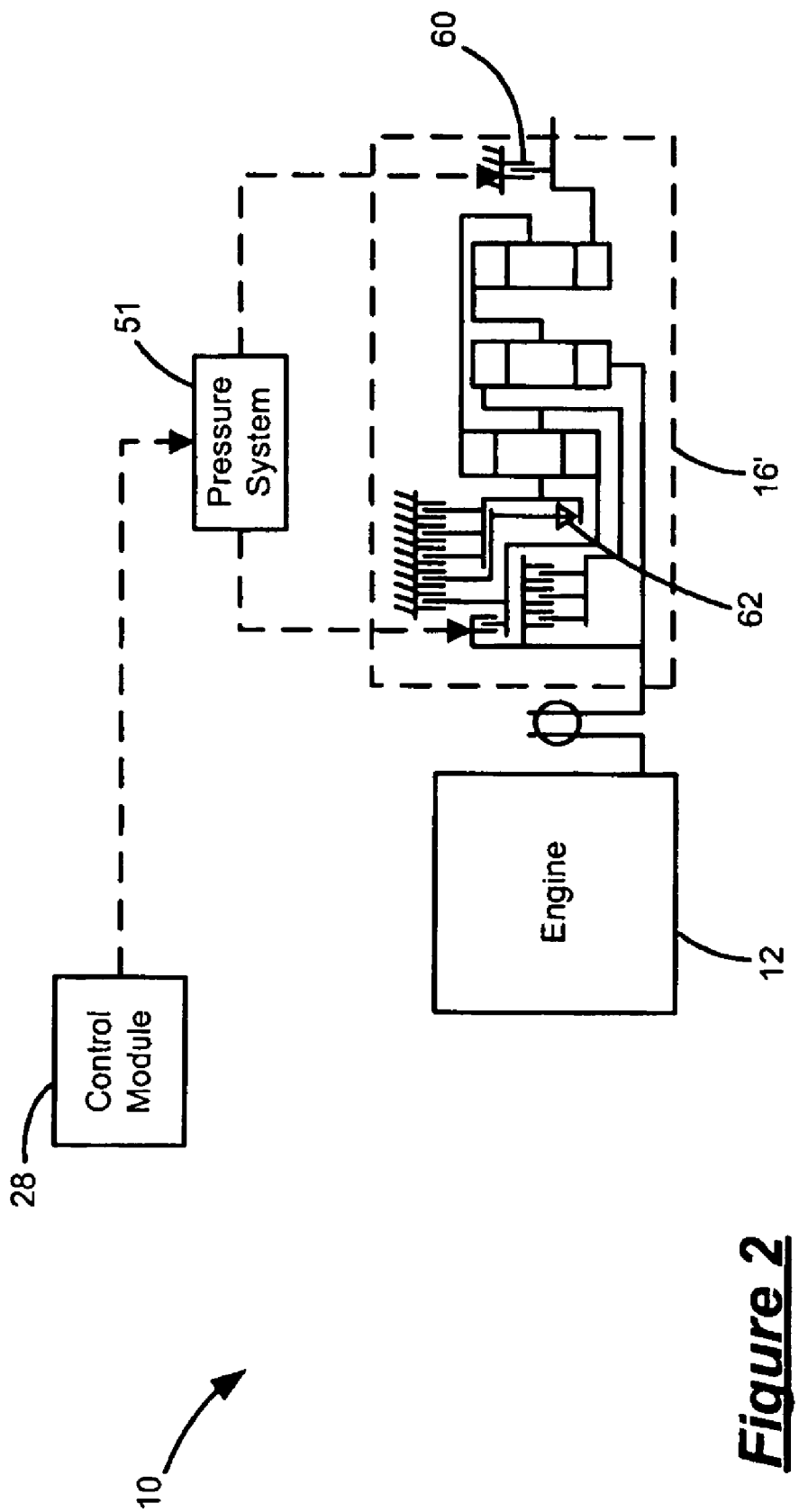
FIG. 2 is a schematic illustration of the vehicle of FIG. 1 including an exemplary transmission.

Referring now to FIG. 2, the vehicle 10 includes an exemplary transmission 16', which is disclosed in commonly assigned U.S. patent application Ser. No. 10/295,120, filed on Nov. 15, 2002, and which is based on U.S. Prov. App. Ser. No. 60/336,126, filed Nov. 15, 2002, the disclosures of which are expressly incorporated herein by reference. It is appreciated that the launch control system of the present invention can be used with other types of transmissions including, but not limited to, those disclosed in U.S. patent application Ser. No. 10/295,120. The exemplary transmission 16' includes a plurality of clutches that are selectively actuated to establish a particular gear ratios. For example, clutches 60 and 62 may be engaged to define a first forward gear ratio. The clutch 60 is modulated during vehicle launch and is defined as the launch clutch. Alternatively, a single clutch may be implemented to establish a particular gear ratio. In the case of a single clutch that defines a first forward gear or a reverse gear, the single clutch is identified as the launch clutch. In the case of multiple clutches, one of the clutches is identified as the launch clutch. The control module 28 communicates with a pressure system 51 that regulates hydraulic pressure to the launch clutch, according to the launch clutch control system of the present invention.

A vehicle launch event occurs when the driver depresses the accelerator pedal 46 while the vehicle is at rest. Upon indication of vehicle launch, the launch control system initiates clutch engagement. The launch control system determines an anticipated engine load upon receiving an imminent clutch engagement signal. The anticipated engine load, which includes clutch torque ($T_{CL}$), is based on clutch capacity (i.e., clutch torque transfer capability), APP (i.e., driver torque demand), gear ratio, vehicle speed, engine speed and MAP.

Figure 3:
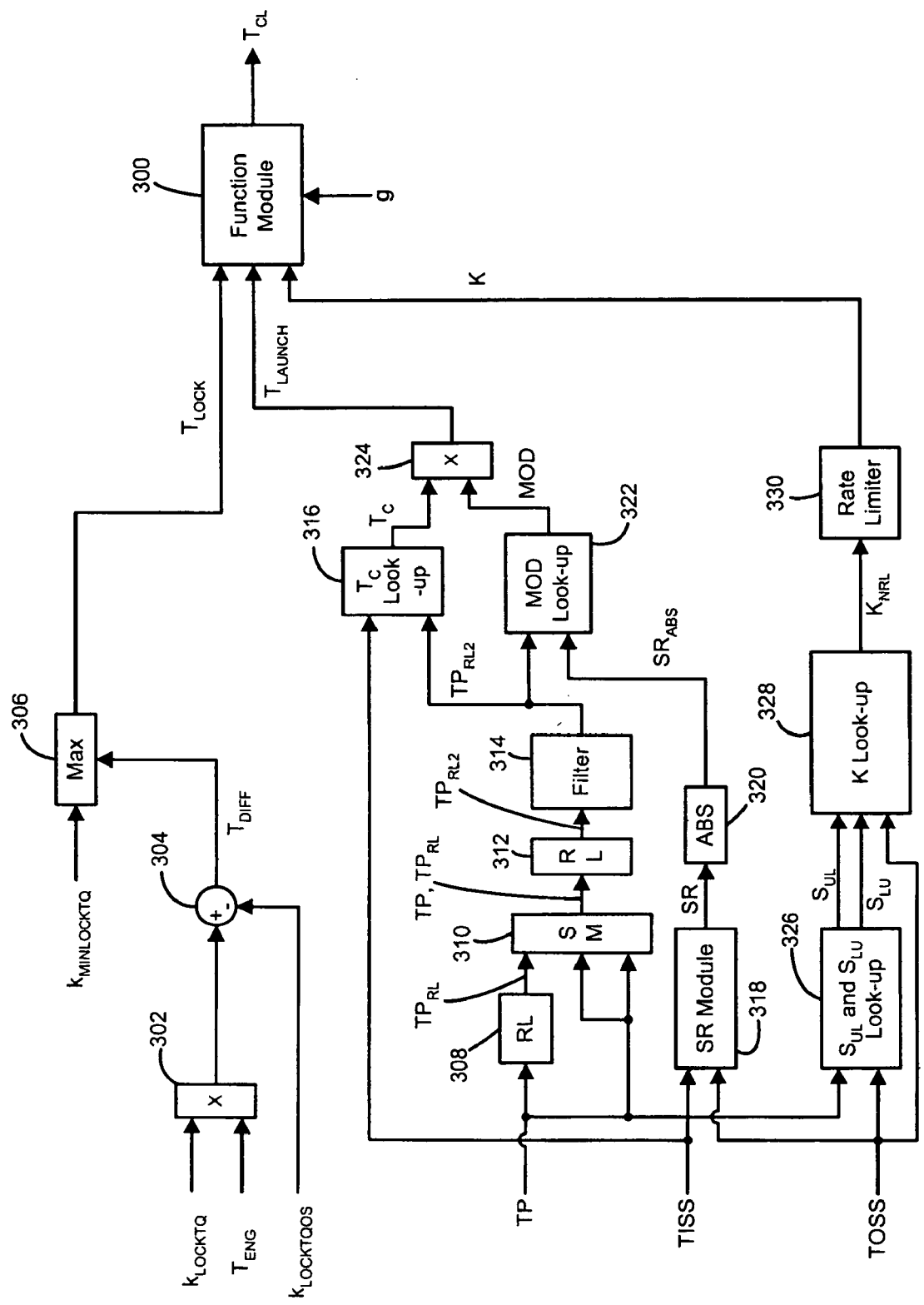
FIG. 3 is a signal flow diagram illustrating calculation of a clutch launch torque according to the present invention.

Referring now to FIG. 3, a signal flow diagram illustrates the signal processing executed by the launch control system to determine $T_{CL}$. $T_{CL}$ is the minimum amount of clutch torque that is necessary to launch the vehicle 10. $T_{CL}$ is based upon a lock torque ($T_{LOCK}$), a launch torque ($T_{LAUNCH}$), a lock-up variable (K) and a clutch gain (g). $T_{CL}$ is calculated based on the following equation:

$$T_{CL} = (T_{LOCK}K + T_{LAUNCH}(1-K)) \cdot g \quad (1)$$

$T_{LOCK}$ is a torque capacity signal that relates to locked conditions and is determined based on engine torque. The friction launch process is controlled based on $T_{LAUNCH}$. g is the ratio of clutch torque to transmission input torque and is provided as a constant. $T_{CL}$ is calculated by a function module 300 based on equation 1.

$T_{LOCK}$ is determined based on a minimum lock torque ($k_{MINLOCKTQ}$), a lock torque ($k_{LOCKTQ}$), a lock torque offset ($k_{LOCKTQOS}$) and an engine torque ($T_{ENG}$). $k_{MINLOCKTQ}$ is the minimum torque required to lock the clutch. $k_{LOCKTQ}$ is a dimensionless constant related to the torque gain for locked conditions and is multiplied by $T_{ENG}$ by a multiplier 302. $k_{LOCKTQOS}$ is subtracted from the product of $k_{LOCKTQ}$ and $T_{ENG}$ by a summer 304 to produce a torque difference signal ($T_{DIFF}$). An operator 306 determines $T_{LOCK}$ as the maximum value between $k_{MINLOCKTQ}$ and $T_{DIFF}$.

$T_{LAUNCH}$ is determined based on TP, TISS and TOSS. TP is rate limited by a rate limiter 308 to provide a rate limited TP ($TP_{RL}$). The rate limiter 308 limits the rate of change of the TP signal to provide a smooth rate of increase rather than having a stepped increase that is typical of aggressive drivers that continuously tap the accelerator pedal. TP and $TP_{RL}$ are input to a switch module 310. The switch module 310 is a logic switch or other suitable switch that is configured to implement a variety of logic schemes. In one logic scheme, the switch module 310 differentiates between two incoming signals based upon a specified percentage of a throttle opening. For example, an output of the switch module 310 can be specified to be less than 2% of a throttle opening. If the $TP_{RL}$ is less than 2% (e.g., 1%) whereas the TP is a greater than 2% (e.g., 5%), the switch module 310 passes $TP_{RL}$. Alternatively, the switch module 310 may be set to pass signals having a percent throttle opening greater than a certain threshold (e.g., 2%). In this scenario, the TP passes through the switch.

Figure 4:
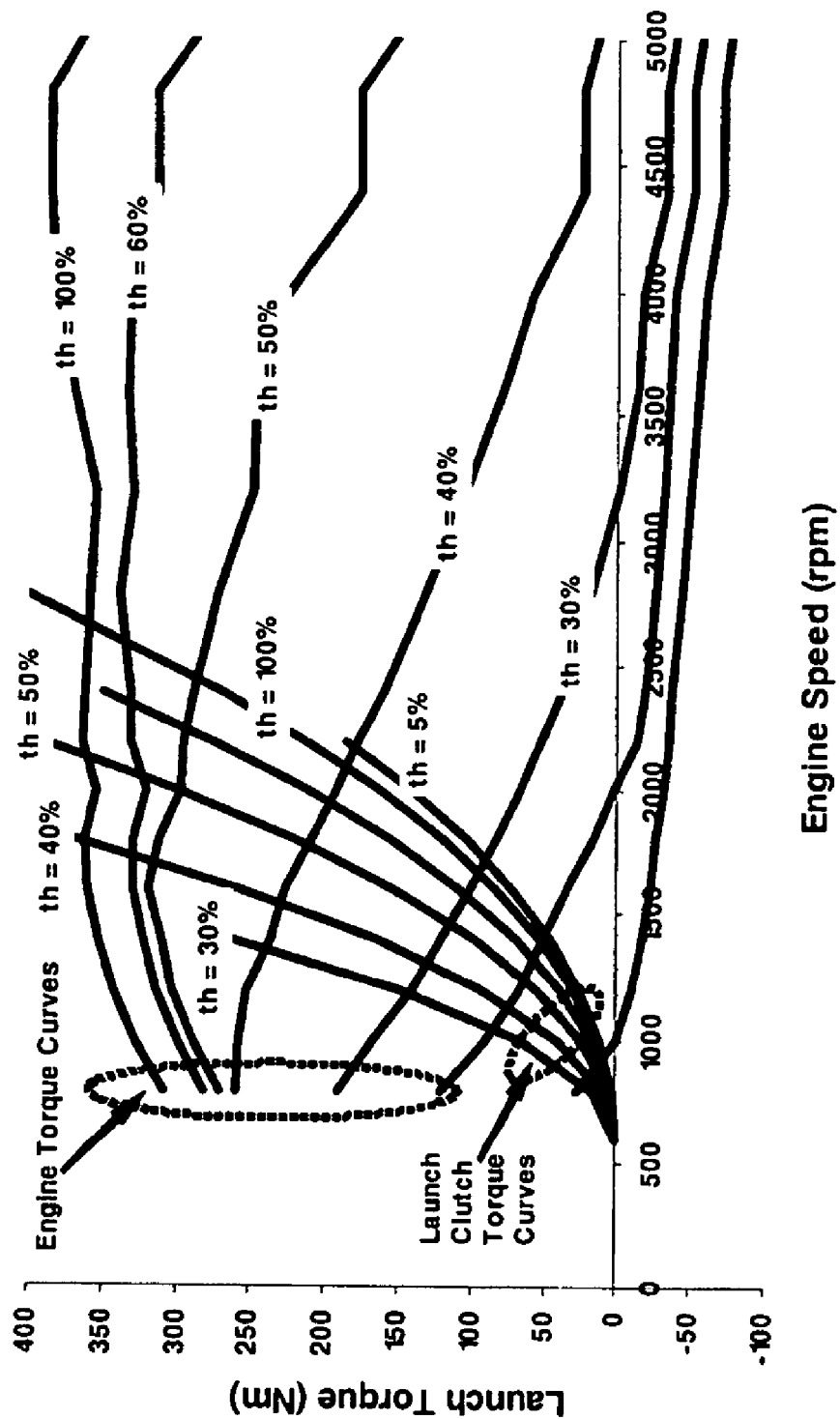
FIG. 4 is a graph illustrating an exemplary look-up table for determining a friction launch torque.
Figure 5:
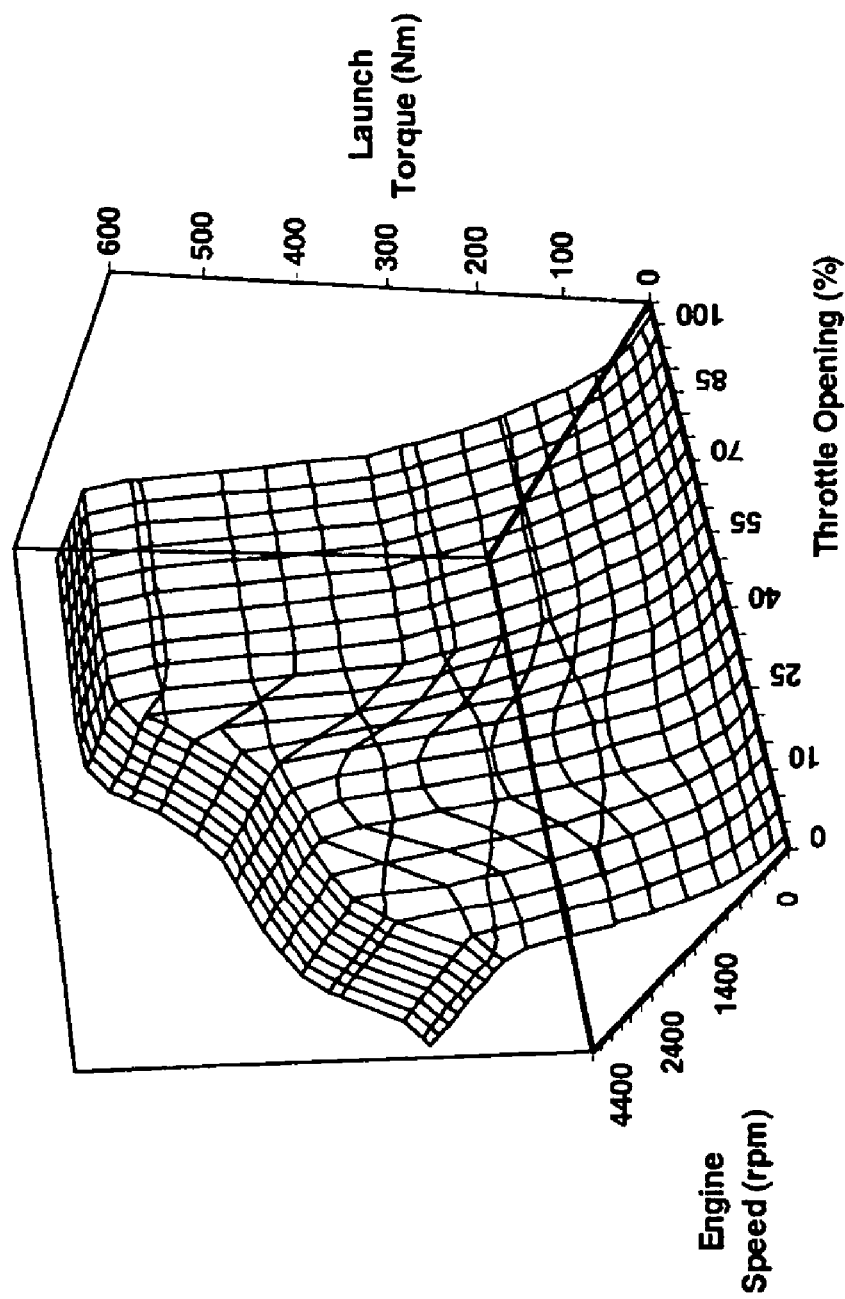
FIG. 5 is a graph illustrating an exemplary look-up table for determining a friction launch torque.

One of TP and $TP_{RL}$ pass through the switch module 310 to a second TP rate limiter 312. The second TP rate limiter 312 further processes the passed signal (TP,$TP_{RL}$) to produce a second rate limited TP signal ($TP_{RL2}$), which provides a smooth transition. $TP_{RL2}$ is processed by a TP filter 314. The TP filter 314 can be a low pass filter that filters out noise from $TP_{RL2}$. An initial launch torque ($T_C$) is determined from a look-up table 316 based on the filtered $TP_{RL2}$ and TISS. An exemplary look-up table is illustrated in FIG. 4 and a corresponding 3-dimensional look-up table is illustrated in FIG. 5. The $T_C$ look-up table enables the launch control system to achieve a desired engine stall speed based on TP and engine speed. In this manner, the launch control system is provided with several degrees of freedom to target that desired stall speed can for arbitrarily established percent throttle openings, balancing performance and fuel economy.

Figure 6:
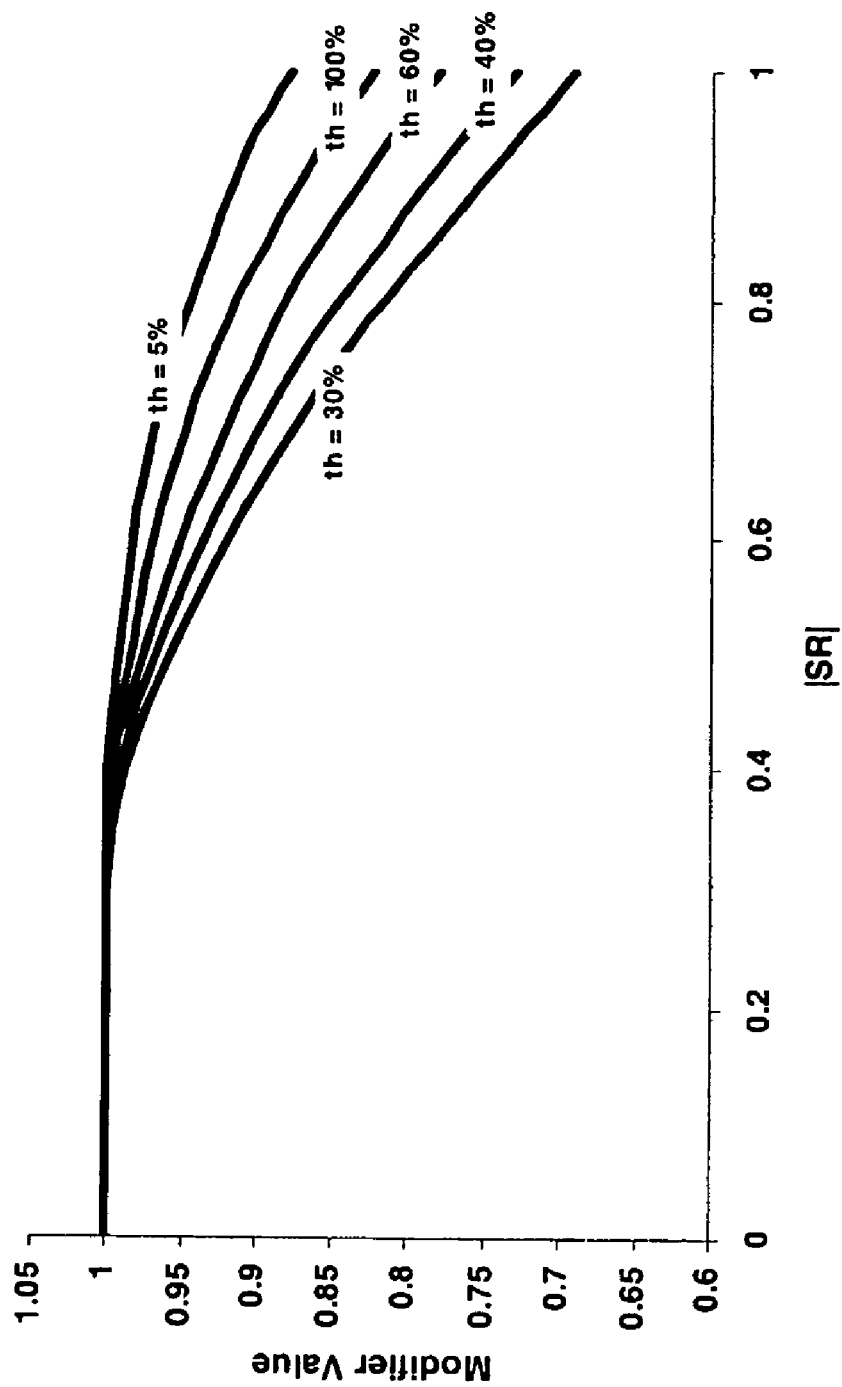
FIG. 6 is a graph illustrating an exemplary look-up table for determining a modifier term.

Referring again to FIG. 3, a speed ratio (SR) is determined by an SR module 318 based on TISS and TOSS. SR is calculated according to the following equation:

$$SR = \frac{TOSS \cdot r}{TISS} \quad (2)$$

where r is the transmission gear ratio the transmission 16 will be operating in when the clutch is fully engaged. The absolute value of SR ($SR_{ABS}$) is determined by an operator 320. A modifier term (MOD) is determined from a look-up table 322 based on $SR_{ABS}$ and the filtered $TP_{RL2}$. An exemplary look-up table is graphically illustrated in FIG. 6. Exemplary values for MOD range between 0.7 to 1. $T_{LAUNCH}$ is determined by a multiplier 324 as the product of $T_C$ and MOD. MOD enables soft lock of the launch clutch to prevent an otherwise noticeable thump or oscillations in the driveline.

Figure 7:
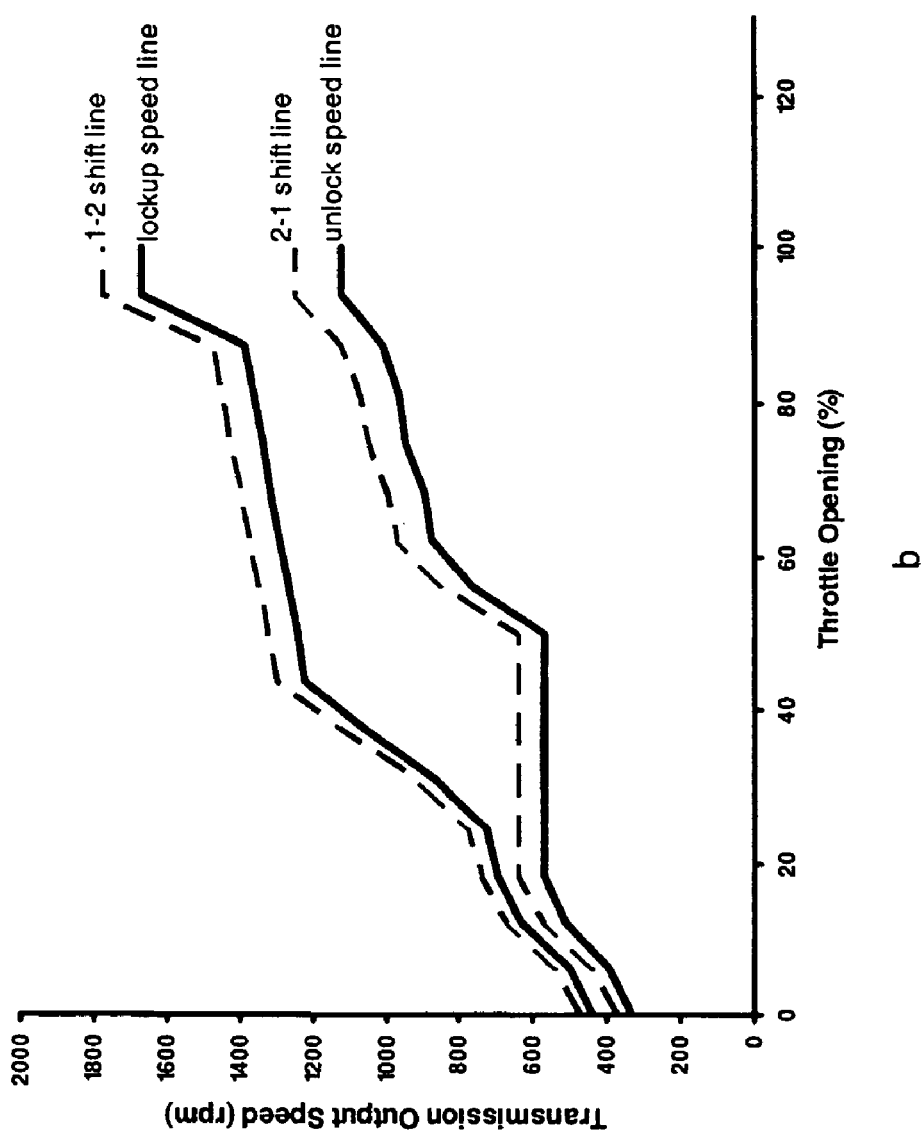
FIG. 7 is a graph illustrating an exemplary look-up table for determining lock-up and unlock speeds.

K, which is the rate-limited value of a variable lock-up, preferably ranges between 0 and 1. K is determined based on TP and TOSS by a look-up module 326. More specifically, a lock-up speed ($S_{LU}$) and an unlock speed ($S_{UL}$) are determined from a look-up table based on TP and TOSS. An exemplary look-up table is graphically illustrated in FIG. 7. $S_{LU}$ and $S_{UL}$ can be determined using the corresponding lock-up and unlock speed lines. Alternatively, dashed lines representing gear shifts can be used to determine $S_{LU}$ and $S_{UL}$. A non rate-limited K ($K_{NRL}$) is determined from a state transition module 328 based on $S_{LU}$, $S_{UL}$ and TOSS. A rate limiter 330 rate limits K to ensure a smooth transition between 0 to 1 or 1 to 0.

Figure 8:
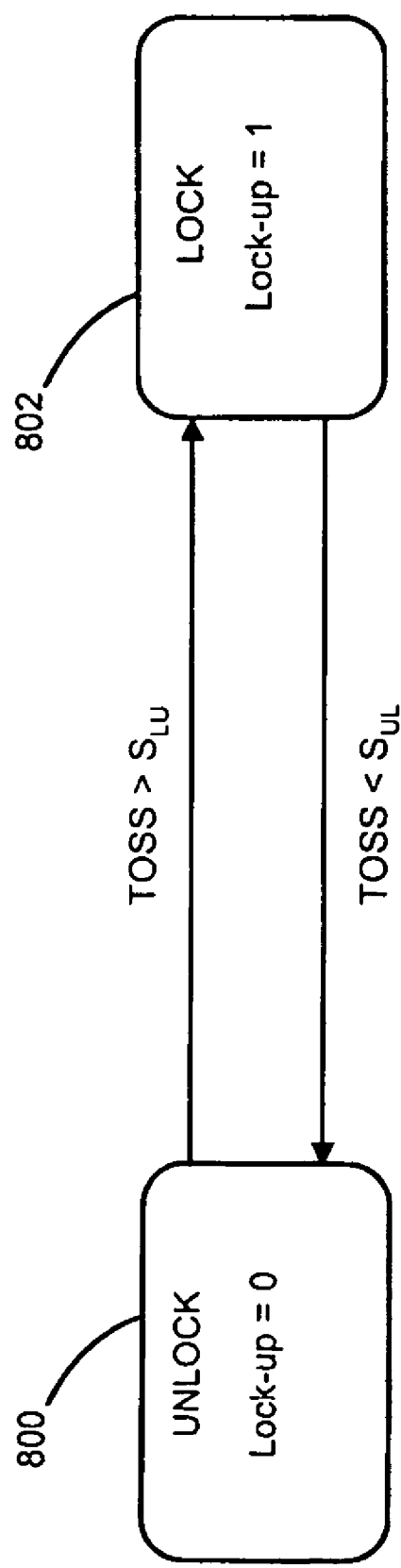
FIG. 8 is a state transition diagram for determining a launch clutch state.

FIG. 8 illustrates an exemplary state transition diagram according to the present invention. The initial clutch state indicated by the control module 28 is the unlock or launch state 410. In the unlock state 800, K is set equal to 0. The unlock state 800 requires TOSS to be less than $S_{LU}$ (e.g., TOSS<$S_{LU}$). TOSS typically ranges from 300 RPM to about 1700 RPM. Skilled artisans appreciate, however, that this range may depend upon the particular characteristics of a vehicle. After the vehicle has been in operation and the $S_{LU}$ has been determined, a state transition occurs from the unlock state 800 to a lock state 802. The state transition occurs when TOSS is greater than $S_{LU}$ (e.g., TOSS>$S_{LU}$). K is set equal to 1 in the lock state 802.

Figure 9:
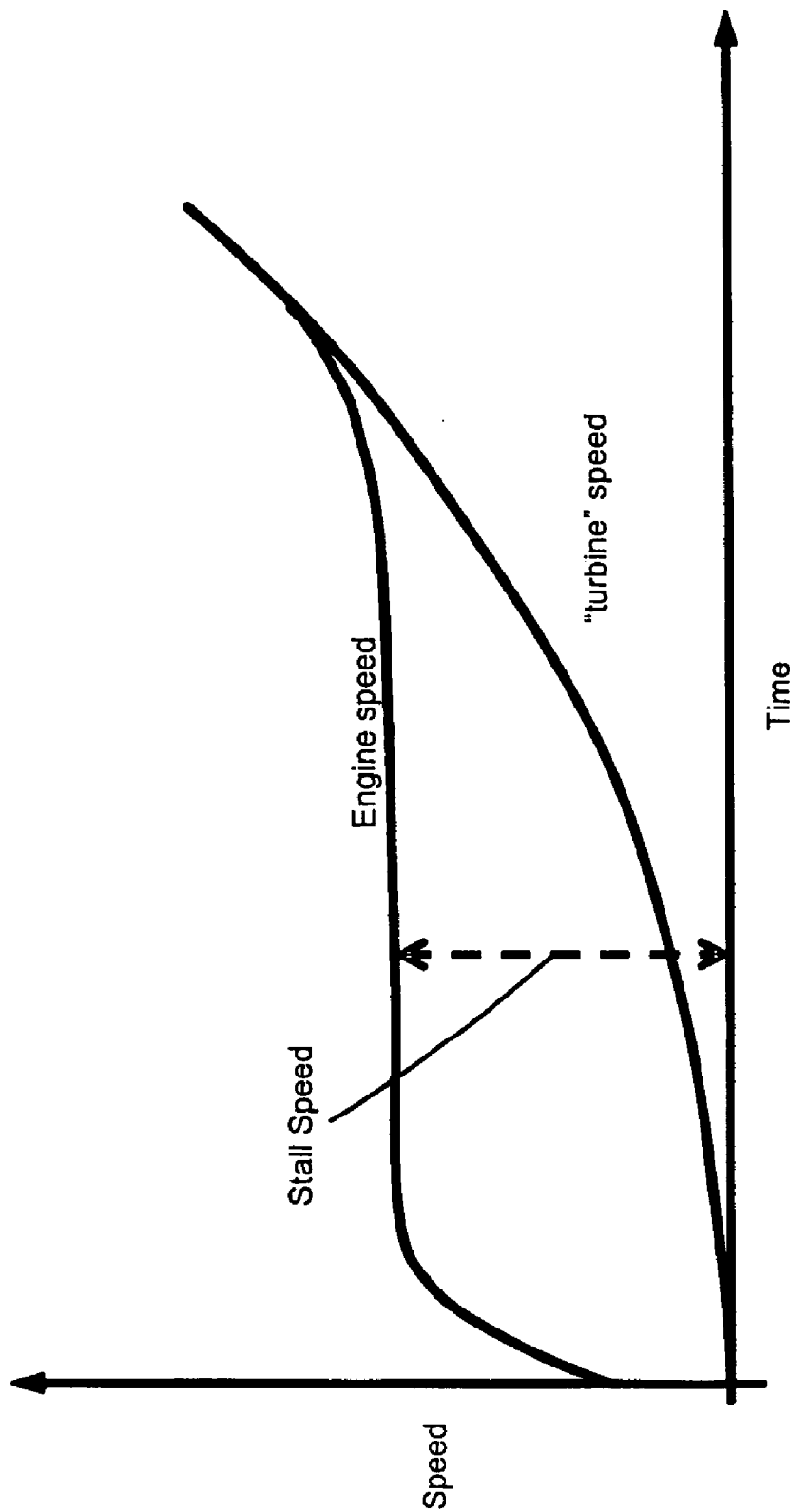
FIG. 9 is a graph illustrating resultant friction launch characteristics using the launch control system of the present invention.

Referring now to FIG. 9, friction launch characteristics using the launch control system of the present invention are illustrated. The graph of FIG. 9 plots vehicle speed versus time. A stall speed is determined by the intersection of the engine speed curve and the turbine speed curve. By implementing techniques of the invention, $T_{CL}$ accounts for a desired stall speed being targeted or determined for arbitrarily established percent throttle openings.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of regulating torque transfer through a clutch during a vehicle launch, comprising:
    determining a launch torque trajectory of said clutch from a plurality of launch torque curves based on a throttle position and an engine speed;
    calculating a clutch torque based on said launch torque trajectory; and
    regulating engagement of said clutch based on said clutch torque.

2. The method of claim 1 wherein said launch torque is determined based on an initial launch torque and a modifier.

3. The method of claim 2 wherein said initial launch torque is determined based on said throttle position and said engine speed.

4. The method of claim 2 wherein said modifier is determined based on a speed ratio across said clutch and said throttle position.

5. The method of claim 1 further comprising determining a lock torque for a clutch of a vehicle transmission, wherein said clutch torque is further calculated based on said lock torque.

6. The method of claim 5 wherein said lock torque is determined based on an engine torque.

7. The method of claim 1 wherein said clutch torque is determined based on a lock-up variable.

8. The method of claim 7 wherein said lock-up variable is based on a lock-up state of said clutch and has a value that ranges from 0 to 1.

9. The method of claim 7 wherein said lock-up variable is determined based on said throttle position and a speed of an output shaft.

10. A method of controlling a vehicle launch, comprising:
    determining a launch torque of a clutch based on a throttle position and an engine speed;
    calculating a clutch torque based on a lock torque and said launch torque; and
    regulating engagement of said clutch based on said clutch torque.

11. The method of claim 10 wherein said launch torque is determined based on an initial launch torque and a modifier.

12. The method of claim 11 wherein said initial launch torque is determined based on said throttle position and said engine speed.

13. The method of claim 11 wherein said modifier is determined based on said throttle position and a speed ratio across said clutch.

14. The method of claim 10 wherein said lock torque is determined based on an engine torque.

15. The method of claim 10 wherein said clutch torque is determined based on a lock-up variable.

16. The method of claim 15 wherein said lock-up variable is based on a lock-up state of said clutch and has a value that ranges from 0 to 1.

17. The method of claim 15 wherein said lock-up variable is determined based on said throttle position and a speed of an output shaft.

* * * * *